United States Patent [19]

Ude et al.

[11] Patent Number: 4,696,993

[45] Date of Patent: Sep. 29, 1987

[54] PHOSPHORUS-CONTAINING POLYARLENE ETHER

[75] Inventors: Werner Ude, Darmstadt-Arheilgen; Joachim Knebel, Darmstadt; Guenter Schroeder, Ober-Ramstadt, all of Fed. Rep. of Germany

[73] Assignee: Röhm GmbH, Darmstadt, Fed. Rep. of Germany

[21] Appl. No.: 870,370

[22] Filed: Jun. 4, 1986

[30] Foreign Application Priority Data

Jun. 13, 1985 [DE] Fed. Rep. of Germany ....... 3521124

[51] Int. Cl.[4] ............................................. C08G 79/04
[52] U.S. Cl. .................................... 528/167; 528/169; 528/398
[58] Field of Search ................................ 528/167, 169

[56] References Cited

U.S. PATENT DOCUMENTS

| | | | |
|---|---|---|---|
| 3,784,504 | 1/1974 | Feasey | 260/37 N |
| 3,960,815 | 6/1976 | Darsow et al. | 260/49 |
| 4,492,805 | 1/1985 | Besecke et al. | 568/12 |

OTHER PUBLICATIONS

Hashimoto, Journal of Macromol. Sci. Chem., All (12), pp. 2167–2176 (1977).

*Primary Examiner*—Harold D. Anderson

*Attorney, Agent, or Firm*—Curtis, Morris & Safford

[57] ABSTRACT

A method for making resinous phosphorus-containing polyarylene ethers of the structure

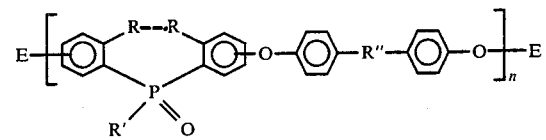

wherein
R taken alone is hydrogen or R    R taken together are a covalent single bond, oxygen, sulfur, or a sulfonyl, carbonyl, methylene or isopropylidene bridge;
R' is alkyl or aryl;
R" is a single bond, oxygen, sulfur, or an organic group having from 5 to 15 carbon atoms whose free valences emanate from quaternary carbon atoms;
E is an end group which is chlorine, hydrogen, alkyl, aryl, or acyl; and
n has an average value of at least 10, by polycondensing appropriate bis(chlorophenyl)phosphine oxides with appropriate bisphenols at an elevated temperature in the presence of alkali in reaction times of at least 10 hours, and certain resinous ethers produced by this method.

16 Claims, No Drawings

PHOSPHORUS-CONTAINING POLYARLENE ETHER

FIELD OF THE INVENTION

The present invention relates to a method for making phosphorus-containing polyarylene ethers and to certain of such resinous ethers.

THE PRIOR ART

German patent publication 32 03 186 teaches phosphorus-containing polyarylene ethers which differ from the phosphorus-containing aromatic polyethers described by S. Hashimoto et al., Journal of Macromol. Sci. Chem., A 11 (12), pp. 2167–2176 (1977), in that they have a higher reduced viscosity, in other words a higher molecular weight, and form masses of considerable strength and with typical resin properties with good self extinguishing characteristics. Their reduced viscosity is at least 0.25 dl/g, which, as a rule of thumb, corresponds with a molecular weight greater than about 30000.

These phosphorus-containing polyarylene ethers are prepared by the polycondensation of bifunctional aromatic compounds having fluorine atoms and hydroxyl groups as reactive groups, of which at least one compound has a phosphine or phosphine oxide partial structure. The reaction times required range from 2 to 10 hours. A serious drawback in the preparation of such substances having resin properties is that, in order to form them, the technically difficultly obtainable and therefore expensive fluorine compounds must be used as polycondensation reactants.

The use of chlorine-containing (and therefore more readily available and cheaper) starting compounds for the preparation of phosphorus-containing polyethers by polycondensation of bis(para-chlorophenyl)phenylphosphine oxide, for example, with aromatic bisphenols in the presence of alkali at high temperatures in a polar solvent of high boiling point within 10 hours is known from the paper by S. Hashimoto et al. However, the polyethers have a relatively low reduced viscosity of 0.15 dl/g or less. They are partly brown, viscous oils and partly gummy masses or crumbly powders. The solid reaction products would not give masses having resin properties.

THE OBJECT OF THE INVENTION

The present invention thus has as its object to provide phosphorus-containing polyarylene ethers which can be prepared from dichlorinated aromatic phosphorus compounds, but whose properties differ from those of the phosphorus-containing polyarylene ethers described by Hasimoto et al. especially in that they have a higher reduced viscosity and have resin properties.

In accordance with the invention, this object is accomplished by the polycondensation of dichlorinated diphenyl- or triphenyl-phospine oxides with bisphenols of the structure

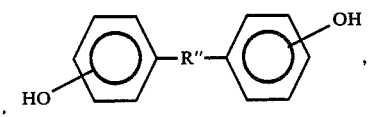

wherein R" is a single bond, an oxygen atom, a sulfur atom, or an organic group having 5 to 15 carbon atoms, the free valences of which emanate from a quaternary carbon atom, in reaction times which are considerably longer than 10 hours and range from 12 to 100 hours, and preferably from 16 to 80 hours, whereby phosphorus-containing polyarylene ethers having a reduced viscosity of at least 0.25 dl/g are obtained which can be processed as such into masses having resin properties.

ADVANTAGES OF THE INVENTION

The surprising formation polycondensates which can be industrially processed into rsins from dichlorinated phenylphosphine oxides and specific bisphenols by using reaction times considerably longer than those known in the art to be employed for the formation of phosphorus-containing polyarylene ethers permits the use of less reactive but much more readily available and decidely cheaper halogen starting compounds. For example, the lower-cost analogous dichloro derivative may be substituted for 4,4'-difluorotriphenylphosphine oxide, a high priced compound that is one of the principal monomers in the preparation of polycondensates in accordance with German patent publication 32 03 186. Further, the sodium chloride then obtained as a by-product in the polycondensation is easier to dispose of than byproduct sodium fluoride.

STRUCTURE OF THE PHOSOPHORUS-CONTAINING POLYARYLENE ETHERS PREPARED IN ACCORDANCE WITH THE INVENTION

In accordance with the invention, polyarylene ethers are obtained in polycondensation times of at least 12 hours by the polycondensation of a dichlorinated phosphorus-containing monomer of the structure

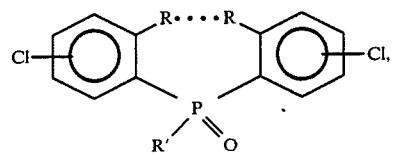

wherein R taken alone is H or R     R taken together is a single bond O, S, $SO_2$, CO, $CH_2$, or $C(CH_3)_2$, and R' is aryl, particularly phenyl, or alkyl, particularly methyl, with a bisphenol of the structure

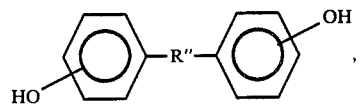

wherein R" has the meanings given above. Quaternary carbon atoms which are rich in electrons, do not attract electrons, and which have at least one aromatic group are present, for example, in the structure

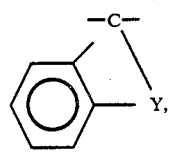

wherein Y may be —CO—O—, o—$C_6H_4$, or —O—(o—$C_5H_4$). In general, R" is a mono- or poly-cyclic organic group having 5 to 15 carbon atoms and one or two quaternary aliphatic carbon atoms which are part of the cyclic system, from which quaternary carbon atoms (or from oxygen) the free valences of the group emanate.

The polycondensates having a reduced viscosity of at least 0.25 dl/g prepared by the process of the invention thus have the structure

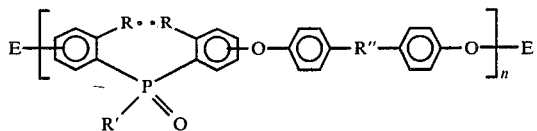

The meanings of R, R', and R" are given above, and n is a number corresponding to the degree of polymerization of the polyarylene ether obtained and has an average value of at least 10. The end groups E may be unreacted chlorine atoms or hydrogen atoms of the phenolic hydroxyl groups. For stabilization of the polymers, hydroxyl end groups are advantageously etherified with methyl chloride, for example, or other alkylating or arylating agents, or are converted with acylating agents to the corresponding esters.

PREPARATION OF THE POLYARYLENE ETHERS

It has been found that polycondensation times considerably longer than 10 hours, and more particularly longer than 12 hours, are required for the preparation of phosphorus-containing polyarylene ethers having the required minimum value of reduced viscosity and the structure given above by polycondensation of the indicated dichlorinated phosphine oxide and bisphenol at raction temperatures ranging from 100° C. to 300° C. in the presence of a polar solvent.

The polycondensation conditions are similar to those described in German patent publication 32 03 186, or U.S. Pat. No. 4,492,805, or those employed by Hashimoto et al., especially so far as the use of appropriate solvents such as chlorobenzene or N-methylpyrrolidone is concerned. The same is true of the strongly basic condensing agents. For the later, the alkali compounds sodium carbonate or potassium carbonate, in particular, are used in an amount equivalent to the amount of chlorine to be cleaved.

To obtain the necessary degree of polycondensation n, it is necessary that the starting compounds be present as precisely as possible in a stoichiometric ratio of 1:1.

The alkali may be used in excess, within limits.

THE STARTING COMPOUNDS

Among the phosphorus-containing starting compounds, the dichloro derivatives of methyldiphenylphosphine oxide and triphenylphosphine oxide are preferred. The chlorine groups are preferably in the para position to the carbon atom attached to the phosphorus atom. Preferred representatives are 4,4'-dichlorotriphenylphosphine oxide and 4,4'-dichlorodiphenylmethylphosphine oxide.

The aromatic bisphenols have their phenolic hydroxyl groups on separate phenylene nuclei. The latter are linked to one another through a single bond, an oxygen atom, a sulfur atom, or through a quaternary carbon atom to which electron-rich aromatic groups are still attached.

Examples of such bisphenols are the compounds (1) to (8) represented below.

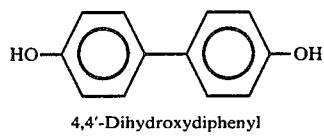

4,4'-Dihydroxydiphenyl (1)

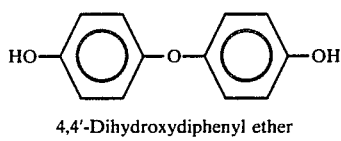

4,4'-Dihydroxydiphenyl ether (2)

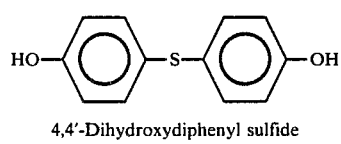

4,4'-Dihydroxydiphenyl sulfide (3)

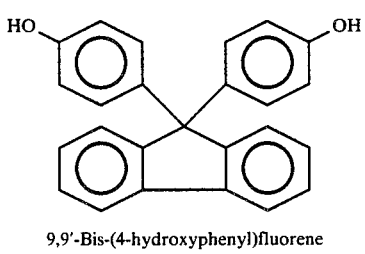

9,9'-Bis-(4-hydroxyphenyl)fluorene (4)

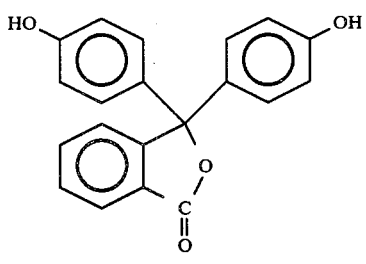

Phenolphthalein (5)

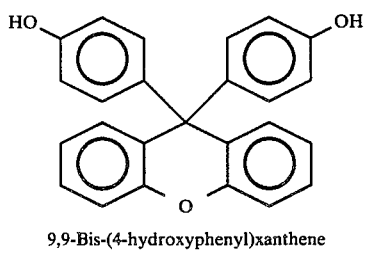

9,9-Bis-(4-hydroxyphenyl)xanthene (6)

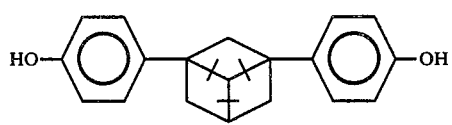

4,4'-Dihydroxyphenyl-adamantane (7)

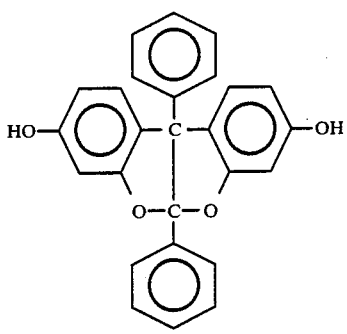

(8)

The invention thus also includes groups R" which are linked by multiple bridges to the phenyl groups attached to the free valences.

A better understanding of the present invention and of its many advantages will be had by referring to the following specific Examples, given by way of illustration.

EXAMPLE 1

10.10 g (0.05 mole) of 4,4'-dihydroxydiphenyl ether, 17.36 g (0.05 mole) of 4,4'-dichlorotriphenylphosphine oxide (purity higher than 98 percent), 7.30 g (0.0525 mole) of potassium carbonate, 75 ml of N-methylpyrrolidone, and 50 g of chlorobenzene were mixed in a 250 ml round bottomed flask equipped with a stirrer, internal thermometer, Liebig condenser with receiver, dropping funnel, and argon inlet. The mixture was heated to boiling temperature under an inert gas and a water/chlorobenzene mixture was distilled off. When practically no further chlorobenzene came over, another 50 g of chlorobenzene were slowly added dropwise to the reaction mixture and distilled off together with residual water still present. The temperature of the still was then raised to about 180° C. and the chlorobenzene was eliminated to the extent possible.

The reaction mixture was then heated for 44 hour at 180° C., at which temperature chloromethane was then blown through for 30 minutes. After cooling, the reaction mixture was diluted with about 20 ml of N-methylpyrrolidone and undissolved matter was removed by filtration. The mixture was then introduced dropwise into 2 liters of water/methanol (volume ratio, 7:3), the precipitated polycondensate was collected on a filter and washed with 50 ml methanol, and the product was then dried for 20 hours at room temperature in an air current. The polyether was then dissolved in as little methylene chloride as possible and precipitated in methanol. The flocculent precipitate was filtered off and dried at 80° C. in a vacuum to constant weight. (Yield: 19.8 g). The material has a reduced viscosity of about 0.65 dl/g.

A clear, yellow, flexible cast foil was recovered from chloroform. Molecular weight: 83,900, as determined by gel permeation chromatography in dimethylformamide using polystyrene as reference substance.

In a comparison example, the reaction was stopped after just 10 hours. Only a very brittle cast foil was recovered from chloroform.

EXAMPLES 2 AND 3

0.05 mole of 4,4'-dichlorotriphenylphosphine oxide according to Example 1 was reacted with different bisphenols. The varied parameters and the results are presented in following Table I:

TABLE I

| Example | Bisphenol | Reaction Time at 180° C. (hr.) | Yield (g) | Reduced Viscosity (chloroform) (dl/g) | Cast Foil From Chloroform |
|---|---|---|---|---|---|
| 2 | 4,4'-Dihydroxydiphenyl | 42 | 8 | 0.58 | Yellow, clear, stable |
| 3 | Phenolphthalein | 20 | 8.7 | 0.32 | Yellow, clear, stable |

EXAMPLE 4

Example 1 is repeated, but using 0.05 mole of 4,4'-dichlorodiphenylmethylphosphine oxide. 16 g of a polyether are obtained having a specific viscosity (in chloroform) of about 0.50 dl/g.

EXAMPLE 5

Example 1 is repeated by reacting 0.05 mole of 4,4'-dichlorotriphenylphosphine oxide with various bisphenols as summarized in following Table II:

TABLE II

| Example | Bisphenol | Reaction Time at 180° C. (hr.) | Yield (g) | Reduced Viscosity (chloroform) (dL/g) |
|---|---|---|---|---|
| 6 | bisphenol 7 | 40 | 14.0 | 0.4 |
| 7 | bisphenol 8 | 42 | 14.5 | 0.3 |
| 8 | bisphenol 4 | 40 | 16.8 | 0.4 |
| 9 | bisphenol 6 | 43 | 14.1 | 0.3 |
| 10 | bisphenol 3 | 55 | 12.8 | 0.4 |
| 11 | | 65 | 16.7 | 0.3 |

What is claimed is:

1. A method for making a resinous phosphorus-containing polyarylene ether of the formula

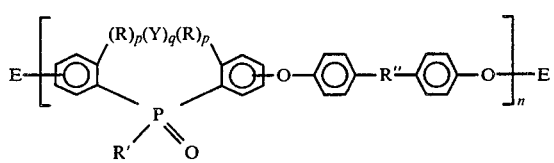

which method comprises polycondensing, at an elevated temperature, in the presence of an amount of alkali equivalent to the amount of halogen in the reagents, and for at least 10 hours, a bis-(chlorophenyl)-phosphine oxide of the formula

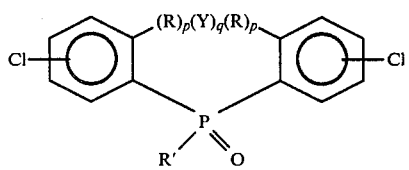

with a bisphenol of the formula

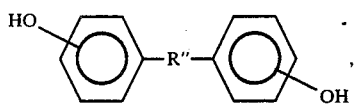

wherein
R hydrogen, p is 1, and q is zero, or wherein p is zero, q is 1 and y is a single bond, or y is oxygen, sulfur, or a sulfonyl, carbonyl, methylene or isopropylidene bridge;
R' is alkyl or aryl;
R" is a single bond or R" represents divalent oxygen, sulfur, or a divalent organic radical having from 5 to 15 carbon atoms and having free valences attached to quaternary carbon atoms;
E is an end group which is chlorine, hydrogen, hydroxyl, alkyl, alkoxy, aryl, aryloxy, acyl, or acyloxy group; and
n has an average value of at least 10.

2. A method as in claim 1 wherein said polycondensation is carried out in the presence of a solvent for the polyarylene ether product.

3. A method as in claim 1 wherein the polycondensation is carried out from 12 to 80 hours.

4. A method as in claim 1 wherein R' is methyl or phenyl.

5. A method as in claim 1 wherein R is hydrogen.

6. A method as in claim 1 wherein R" is oxygen.

7. A method as in claim 1 wherein R" is a single bond.

8. A method as in claim 1 wherein the bisphenol is 9,9-bis(4-hydroxyphenyl) fluorene.

9. A method as in claim 1 wherein the bisphenol is phenolphthalein.

10. A method as in claim 1 wheein the bisphenol is 9,9-bis(4-hydroxphenyl) xanthene.

11. A resinous phosphorus-containing polyarylene ether comprising repeating units of the structure

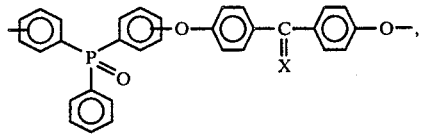

wherein X is one of the groups

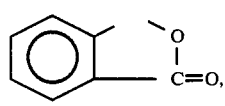

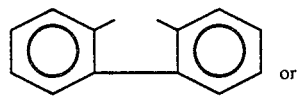

or

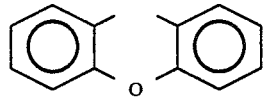

12. An ether as in claim 11 having F, Cl, OH, or OCH$_3$ end groups.

13. A resinous phosphorus-containing polyarylene ether composed of repeating units of the structure

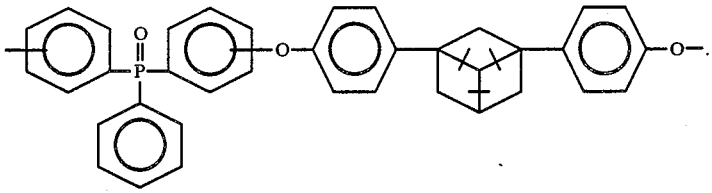

14. An ether as in claim 13 having F, Cl, OH, or OCH$_3$ end groups.

15. A resinous phosphorus-containing polyarylene ether composed of repeating units of the structure

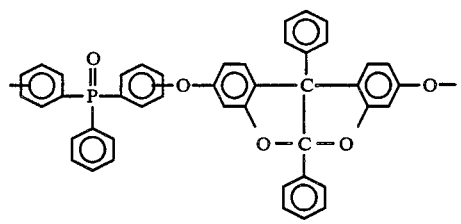

16. An ether as in claim 15 having F, Cl, OH, or OCH$_3$ end groups.

* * * * *

UNITED STATES PATENT AND TRADEMARK OFFICE
CERTIFICATE OF CORRECTION

PATENT NO. : 4,696,993                                       Page 1 of 2

DATED : September 29, 1987

INVENTOR(S) : Werner Ude et al.

It is certified that error appears in the above-identified patent and that said Letters Patent is hereby corrected as shown below:

In the Title: Replace "POLYARLENE ETHER" by --POLYARYLENE ETHERS--.

In the Abstract, line 5, replace "R    R" by -- R...R --.

Column 2, line 10, replace "rsins" by --resins--;

line 43, replace "R    R" by -- R...R --;

line 67, replace "(o-$C_5H_4$)" by --(o-$C_6H_4$).

UNITED STATES PATENT AND TRADEMARK OFFICE
CERTIFICATE OF CORRECTION

PATENT NO. : 4,696,993

DATED : September 29, 1987

INVENTOR(S) : Werner Ude et al.

It is certified that error appears in the above-identified patent and that said Letters Patent is hereby corrected as shown below:

Columns 5-6, in TABLE II replace the formula by 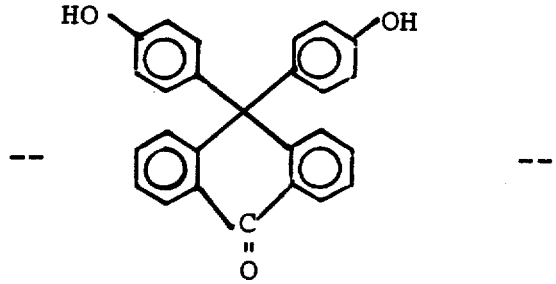 --

Column 8, line 6, replace "wheein" by --wherein--.

Signed and Sealed this

Twenty-ninth Day of March, 1988

Attest:

DONALD J. QUIGG

Attesting Officer   Commissioner of Patents and Trademarks